United States Patent
Austin et al.

(10) Patent No.: US 11,236,856 B2
(45) Date of Patent: Feb. 1, 2022

(54) SEISMIC RETENTION ASSEMBLY FOR WEIGH MODULE AND METHOD

(71) Applicants: James A. Austin, Fort Worth, TX (US); Jeffrey O. Getrum, Fort Worth, TX (US)

(72) Inventors: James A. Austin, Fort Worth, TX (US); Jeffrey O. Getrum, Fort Worth, TX (US)

(73) Assignee: ConeCraft, Inc., Fort Worth, TX (US)

( * ) Notice: Subject to any disclaimer, the term of this patent is extended or adjusted under 35 U.S.C. 154(b) by 145 days.

(21) Appl. No.: 15/931,704

(22) Filed: May 14, 2020

(65) Prior Publication Data

US 2021/0356073 A1 Nov. 18, 2021

(51) Int. Cl.
*F16M 13/02* (2006.01)
*F16M 11/22* (2006.01)
*F16M 11/04* (2006.01)

(52) U.S. Cl.
CPC ............ *F16M 13/02* (2013.01); *F16M 11/04* (2013.01); *F16M 11/22* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,929,592 A * | 3/1960 | Spaetgens | ................. | F16F 7/08 248/621 |
| 3,762,671 A * | 10/1973 | Schulz | ..................... | F16M 7/00 267/140.2 |
| 4,151,822 A * | 5/1979 | Miura | ..................... | F16F 1/387 123/192.1 |
| 4,356,992 A * | 11/1982 | Benkert | ................ | F16F 15/067 248/578 |
| 5,092,097 A * | 3/1992 | Young | ................... | E04B 1/2608 52/264 |
| 5,595,371 A * | 1/1997 | Hukuda | ................ | F16F 15/067 267/34 |
| 5,657,649 A * | 8/1997 | Lim | ........................ | D06F 37/24 68/23.3 |
| 6,079,698 A * | 6/2000 | Patterson | .................. | F16F 3/10 267/136 |
| 6,585,241 B1 * | 7/2003 | Hartl | ..................... | B61D 49/00 267/136 |
| 7,503,553 B2 * | 3/2009 | Brannan | ................ | B62D 33/10 267/248 |
| 9,316,279 B2 * | 4/2016 | Meisel | .................... | E04H 9/021 |
| D777,015 S * | 1/2017 | Deveci | .......................... | D8/354 |

* cited by examiner

*Primary Examiner* — Monica E Millner
(74) *Attorney, Agent, or Firm* — Dan Brown Law Office; Daniel R. Brown (57) ABSTRACT

A seismic retention assembly for retaining equipment supported on weigh modules in place during and after a seismic event. The assembly includes a seismic bracket with a mounting plate and a flange that extends beyond the weigh module, and with a retention aperture formed through the flange, located adjacent to the equipment. A retention fastener includes a nut fixed to the equipment in alignment with the aperture, and also a bolt that passes through the aperture and engages the nut. Clearance between the bolt and the aperture enables unimpeded operation of the weigh module during normal use, but limits movement during a seismic event.

16 Claims, 6 Drawing Sheets

SEISMIC RETENTION ASSEMBLY FOR WEIGH MODULE AND METHOD

BACKGROUND OF THE INVENTION

Related Applications

None.

Field of the Invention

The present invention relates to securing equipment supported upon weigh modules during seismic events. More particularly, the present invention relates to a seismic retention assembly and method for securing equipment in the event that a seismic event damages weigh modules that supports such equipment.

Description of the Related Art

Weigh modules, including strain gauge type weigh modules, are utilized in a wide range of industrial and commercial applications. Weigh modules measure static and dynamic forces acting upon them, and provide an electronic signal indicating the weight and/or dynamic forces acting upon them. For example, a liquid tank can be supported upon a plurality of weigh modules, whose output signals are combined to provide an accurate measure of the weight of the tank and its content. By subtracting the tare weight of the tank, the dynamic weight of the tank contents can be monitored, thereby indicating the mass and volume of the tank contents. Of course, there are many other industrial and commercial weighing applications, as will be appreciated by those skilled in the art.

Weigh modules are designed and specified for a predetermined load range where accuracy is acceptable for any given application. Such weigh modules are also designed and specified for a maximum load, beyond which physical damage to the weigh module is expected. Designers primarily select weigh modules whose accurate load ranges match the requisite measuring needs of any given application. However, over the lives of weigh modules, there may be dynamic events where forces acting on a weigh module exceed its maximum load rating. Events of particular concern are seismic events, such as earthquakes, where very large forces may act upon such weigh modules, which may induce critical, and highly dangerous, failures. When such a failure occurs, the underlying support of whatever type of equipment that rests upon the weigh modules, may be lost entirely, and such equipment may become unrestrained, allowing it to move freely under whatever forces may exist after the failure. This results in a highly dangerous situation, particularly where the nature and content of the equipment is, in an of itself, dangerous. For example, dangerous or flammable materials may be contained in such equipment. Thus it can be appreciated that there is a need in the art for an assembly and method for retaining items of equipment that are supported on weigh modules during seismic events, but which do not interfere with normal operation of such weigh modules.

SUMMARY OF THE INVENTION

The need in the art is addressed by the apparatuses and methods of the present invention. The present disclosure teaches a seismic retention assembly for equipment that is supported above a support structure by one or more weigh modules, where each weigh module has a base plate. The assembly includes a seismic bracket with a mounting plate that is placed between the support structure and the base plate, and a flange fixed to the mounting plate that extends beyond the weigh module, and with a retention aperture formed through the flange that is positioned adjacent to the equipment. The assembly also includes a retention fastener that includes a nut rigidly fixable to the equipment, which is aligned with the retention aperture, and also a bolt with a shank and a head. The shank passes through the retention aperture and threadably engages the nut while still providing a clearance between the shank and the head of the bolt, and the flange and the retention aperture, and this arrangement enables unimpeded operation of the weigh module while preventing movement of the equipment beyond the clearance, regardless of weigh module failure caused by a seismic event.

In a specific embodiment of the foregoing assembly, the nut is welded to the equipment. In another specific embodiment, the assembly further includes a flange brace that also extends from the mounting plate and that is joined with the flange in orthogonal alignment therewith, which enables structural support along three axes with respect to the retention aperture.

In a specific embodiment, the foregoing assembly further includes a retention washer disposed about the shank of the bolt, and positioned between the flange and the head of the bolt to thereby retain the flange about the retention aperture.

In a specific embodiment, the foregoing assembly further includes a lock washer bindingly disposed within the nut and between a proximal end of the shank of the bolt and the equipment to thereby resist rotation of the bolt with respect to the nut.

In a specific embodiment, the foregoing assembly further includes a base stand disposed between the mounting plate and the support structure, and where the base stand includes plural seismic bracket mounting positions, and includes plural mounting clips fixed thereto, which are adapted for fixed attachment to the support structure.

In a specific embodiment, the foregoing assembly further includes a centering bolt that has a conical head portion and a threaded shank sized to engage the nut, and, the centering bolt is suitable to locate and align the nut with respect to the retention aperture, and the equipment, by engagement of the conical portion with the retention aperture, to thereby locate the nut prior to rigid fitment of the nut to the equipment.

In a specific embodiment of the foregoing assembly, where the weigh module base plate includes plural mounting holes, the mounting plate includes plural bolt holes aligned with the plural mounting holes in the weigh module base plate.

The present disclosure teaches a seismic retention assembly for equipment supported above a support structure by one or more weigh modules, where each weigh module has a base plate. The assembly includes a seismic bracket that has a mounting plate for placement between the support structure and the weigh module base plate, and that has a flange fixed thereto that extends beyond the weigh module, and that has a retention aperture formed through the flange, which is positioned adjacent to the equipment. The assembly further includes a retention fastener including an attachment means for rigid connection to the equipment at a location aligned with the retention aperture, and that has a shank with a boss at a distal end thereof. The shank is sized to pass through the retention aperture to fixedly engage the equipment with the attachment means, while still providing a clearance between the shank and the boss, and the flange and the retention aperture, to thereby enable unimpeded operation of the weigh module while preventing movement of the equipment beyond the clearance.

The present disclosure teaches a method of installing a seismic retention assembly between a support structure and an item of equipment that is supported by one or more weigh modules, where the seismic retention assembly includes a seismic bracket with a mounting plate and a flange extending therefrom, the flange having a retention aperture formed therethrough, and where the seismic retention assembly further includes a retention fastener comprised of a nut and a bolt having a shank and a head. The method included placing the mounting plate of the seismic bracket between the support structure and the weigh module base plate, and supporting the equipment on the weigh module, so that the flange extends beyond the weigh module, and the retention aperture is located adjacent to the equipment. Then, positioning the nut adjacent the equipment and aligning the nut with the retention aperture, and rigidly fixing the nut to the equipment. Also, inserting the shank of the bolt through the retention aperture and threading it into the nut, while providing clearance between the shank and the head of the bolt, and the flange and the retention aperture, which enables unimpeded operation of the weigh module while preventing movement of the equipment beyond the clearance.

In a specific embodiment of the foregoing method, the rigidly fixing step further includes welding the nut to the equipment.

In a specific embodiment of the foregoing method, where the flange is further reinforced by a flange brace extending from the mounting plate, and joined with the flange in orthogonal alignment therewith, the method thereby enables structural support of the equipment along three axes with respect to the retention aperture.

In a specific embodiment, the foregoing method further includes placing a retention washer on the shank of the bolt, positioned between the flange and the head of the bolt, thereby retaining the retention aperture thereabout.

In a specific embodiment, the foregoing method further includes placing a lock washer within the nut, between a proximal end of the shank of the bolt and the equipment to thereby bindingly resisting rotation of the bolt with respect to the nut.

In a specific embodiment, the foregoing method further includes locating and aligning the nut with resect to the retention aperture and the equipment by inserting a centering bolt, which has a conical head and a threaded shank, through the retention aperture and engaging the nut with a proximal end thereof, and urging the nut against the equipment, and then welding the nut to the equipment.

The present disclosure teaches a method of installing a seismic retention assembly between a support structure and an item of equipment that is supported by one or more weigh modules, where the seismic retention assembly including a seismic bracket with a mounting plate and a flange extending therefrom, and where the flange has a retention aperture formed though it, and where the seismic retention assembly further includes a retention fastener having an attachment means for rigid connection to the equipment and a shank with a boss at a distal end thereof. The method includes placing the mounting plate of the seismic bracket between the support structure and the weigh module base plate, and supporting the equipment on the weigh module, such that the flange extends beyond the weigh module, to a location where the retention aperture is adjacent to the equipment. Then, positioning the attachment means adjacent the equipment and in alignment with the retention aperture, and inserting the shank through the retention aperture and fixedly engaging a proximal end thereof with the attachment means with the equipment, while providing clearance between the shank and the boss, and the flange and the retention aperture, which thereby enables unimpeded operation of the weigh module while preventing movement of the equipment beyond the clearance.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof, and additional fields in which the present invention would be of significant utility.

In considering the detailed embodiments of the present invention, it will be observed that the present invention resides primarily in combinations of steps to accomplish various methods or components to form various apparatus and systems. Accordingly, the apparatus and system components, and method steps, have been represented where appropriate by conventional symbols in the drawings, showing only those specific details that are pertinent to understanding the present teachings so as not to obscure the disclosure with details that will be readily apparent to those of ordinary skill in the art having the benefit of the disclosures contained herein.

In this disclosure, relational terms such as first and second, top and bottom, upper and lower, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element.

Weigh modules are used in a wide range of commercial and industrial applications to measure, both statically and dynamically, the weight of equipment any contents of such equipment. For example, weighing a tank containing liquid to track the amount of liquid in the tank at any given time. Since weigh modules operate within specified load ranges in order to provide accurate readings, they are necessarily fragile when exposed to loads beyond their specified operating ranges. Where the possibility of extreme loads are anticipated, engineers need to consider the consequences of complete structural failure of weigh modules. That is, the unrestrained movement of the equipment once weigh module structural failure occurs. An example of this is an earthquake or other seismic event, and what might occur to such equipment. A retentive safety structure may be warranted, yet the installation of such a retentive structure must not interfere with the normal operation of the weigh modules it serves to reinforce.

Figure 1:
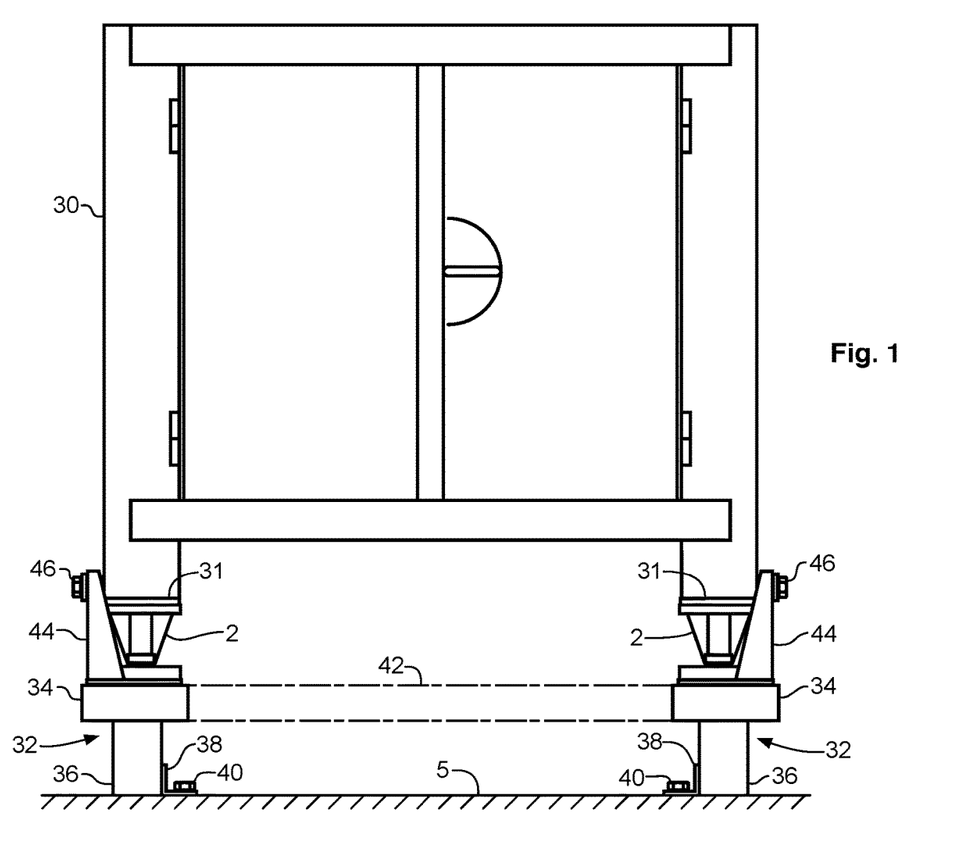
FIG. 1 is a front view drawing of equipment supported on weigh modules protected by seismic retentions assemblies according to an illustrative embodiment of the present invention.
Figure 2:
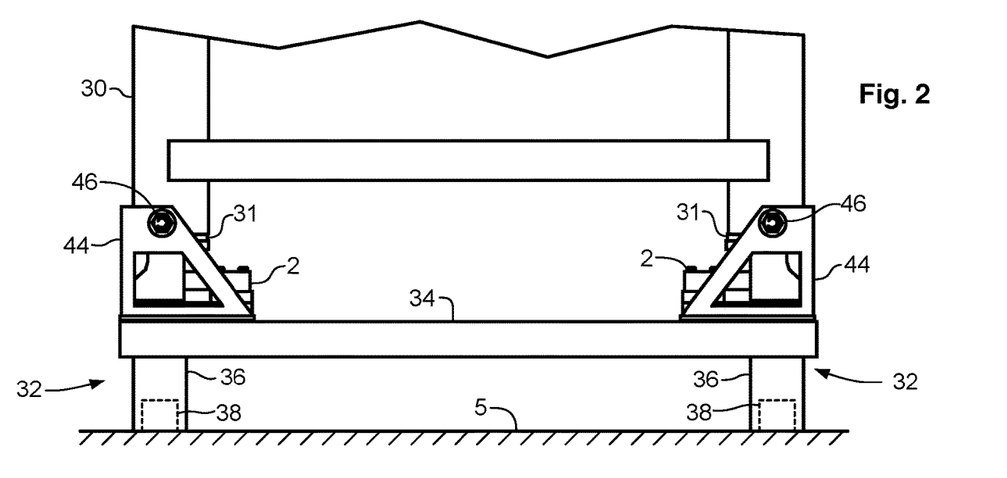
FIG. 2 is a partial side view drawing of equipment supported on weigh modules protected by seismic retentions assemblies according to an illustrative embodiment of the present invention.

Reference is directed to FIG. 1 and FIG. 2, which are a front view drawing and a partial side view drawing, respectively, of equipment 30 supported on weigh modules 2 protected by seismic retentions assemblies 44, 46 according to an illustrative embodiment of the present invention. The equipment 30 in this embodiment is a stainless steel enclosure 30 for a sterile liquid bag, inside (not shown), whose weight is measured to track liquid content. The equipment 30 terminates at its lower portion with plural mounting flanges 31. Each of the plural mounting flanges 31 rest upon a corresponding weight module 2. The weigh signals from the weigh modules 2 a summed together to determine the weight of the entire equipment 30. Absent the teachings of the present disclosure, the weigh modules 2 would simply rest upon the support structure 5, which is a building floor 5 in this embodiment, although any type of suitable support structure could be employed, as will be appreciated by those skilled in the art.

The weight modules in FIGS. 1 and 2 are each reinforced by a seismic bracket 44 and corresponding retention fastener 46, which together comprise a seismic retention assembly, which will be more fully discussed hereinafter. In the event of a failure of the weigh modules 2, the equipment 30 will be prevented from moving by more than a clearance distance by the seismic retention assemblies 44, 46. In this illustrative embodiment, a base stand 32 is provided between the support structure 5 and the weigh modules 2. The base stand 32 comprises plural vertical members 36 and plural cross members 34, and an optional cross brace 42 between the plural cross members 34. In the illustrative embodiment, the base stand 32 members are fabricated from stainless steel, although, any suitable structural material may be employed. The vertical members each include a mounting clip 38 with corresponding anchor bolt 40 engaged with the support structure 5, such as concrete anchors in the illustrative embodiment. This arrangement provided, inter alia, the benefit of convenient anchoring access to the support structure 5.

With respect to the aforementioned industrial and commercial weigh modules 2, these are provided in a wide range of configurations, but do share some common features. Generally speaking, each weigh module comprises a strain gauge, which is a device used to measure strain on an "object". The most common type of strain gauge consists of an insulating flexible backing that supports a metallic foil pattern. The gauge is attached to the "object" by a suitable adhesive. As the "object" is deformed by forces applied to it, the foil is deformed, causing its electrical resistance to change. This resistance change, usually measured in a Wheatstone bridge circuit, is related to the strain by a quantity known as the gauge factor. The "object" is typically a structural member that is deflected by a load impressed upon it. In this disclosure, when reference is made to a "load cell", that is referring to such an "object" with a stain gauge already adhered to it. A further common configuration of a weigh module is the use of a load bearing top plate, unto which an item of equipment is placed so as to induce forces through the top plate and into the load cell with its strain gauge sensing the resultant deflection, and which is located below the top plate. Other components and elements may be added to this basic configuration to form a more complete, or purpose-specific, weigh module.

Figure 3:
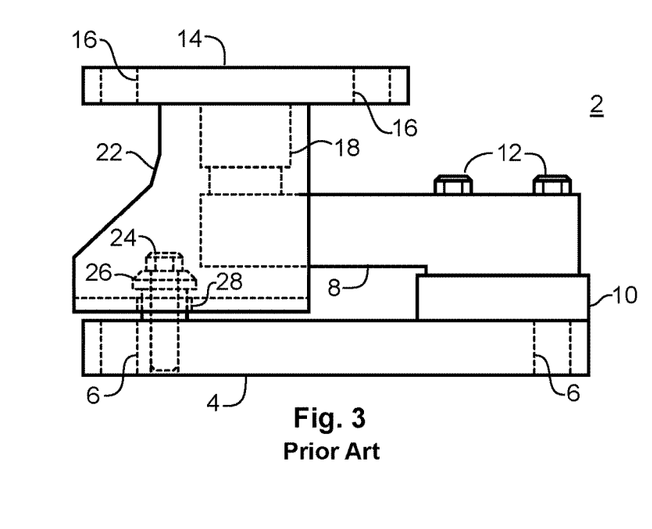
FIG. 3 is an end view drawing of a weigh module according to the prior art.
Figure 4:
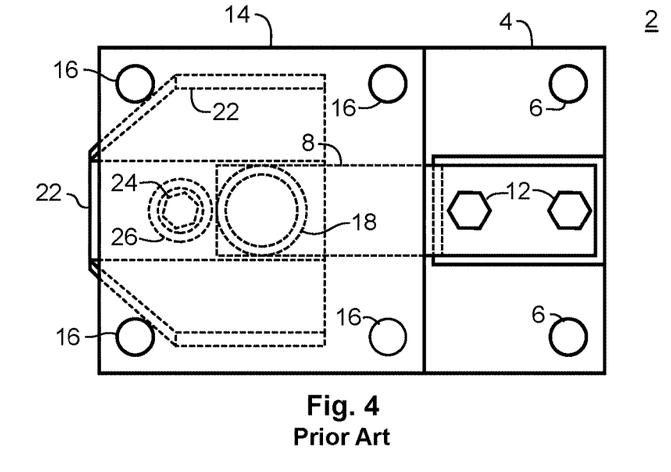
FIG. 4 is a side view drawing of a weigh module according to the prior art.
Figure 5:
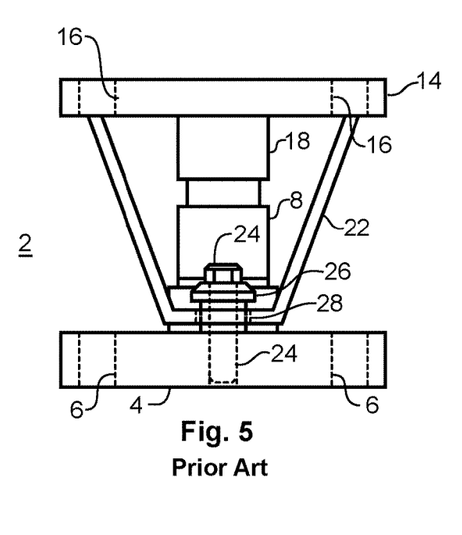
FIG. 5 is a top view drawing of a weigh module according to the prior art.

Reference is directed to FIG. 3, FIG. 4, and FIG. 5, which are side view, top view, and end view drawings, respectively, of a prior art weigh module 2. This weigh module 2 includes a top plate 14 that is connected through a swivel mount 18 to a load cell 8. The load cell 8 is bolted 12 to a base plate 4 thought a spacer mount 10. The base plate 4 has a plurality of bolt holes 6 formed therethrough for rigidly attaching the weigh module 2 to a support structure (not shown), which supports the weigh module 2 and whatever load may be applied to it. Similarly, the top plate 14 has a plurality of bolt holes 16 for attaching an item of equipment (not shown), typically having an equipment flange (not shown) adapted to correspondingly engage the top plate 14 and its bolt holes 16. Note that the swivel mount 18 provides for some planar misalignment 20 of the top plate 14 upper surface with respect to the base plate 4 bottom surface. The weigh module 2 may be fabricated from a variety of suitable materials, as are known to those skilled in the art, and which commonly includes various alloys of stainless steel.

The configuration of weigh module 2 is such that any force applied to the top plate 14 is transferred through the swivel mount 18 and the load cell 8, which acts as a cantilever with attendant bending that is sensed by the strain gauge (not shown). Where the force applied exceeds that bending strength of the load cell 8, failure will occur. When such failure occurs, the strain gauge 8 may shear, resulting in uncontrolled support of whatever equipment (not shown) is being supported, and this action may result in a dangerous situation.

Figure 6:
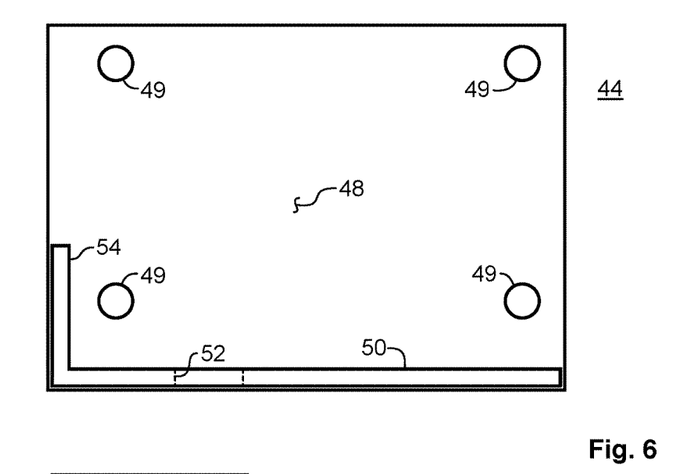
FIG. 6 is a top view drawing of a seismic bracket according to an illustrative embodiment of the present invention.

FIG. 4, FIG. 5, and FIG. 6, also illustrate the use of an optional dead stand 22, which is added to the weigh module 2, as illustrated, such as by welding it to the underside of top plate 14. The dead stand 22 serves to maintain location of the tope plate 14 in the event of a failure, provided that the forces do not exceed the dead stand design limitations. To prevent the dead stand 22 from moving out of position, an anti lift-off bolt 24 with anti lift-off bushing 26 are provided. The anti lift-off bolt 24 threadably engages the base plate 4. Note that a hole 28 is formed through a lower portion of the dead stand 22, which has a larger diameter than the anti lift-off bushing 26, such that during normal operation the dead stand 22 does not interfere with, nor affect, the operation or accuracy of the weigh module 2. Similarly, note the gap between the base plate 4 upper surface and the dead stand 22 lower surface, as well as the gap between the anti lift-off bushing 26 and the hole 28 in the dead stand 22. It is within these gaps that weigh module suppliers insert restraint shims (not shown) to protect the load cell 8 from excessive forces prior to initiation of normal weighing operations, as discussed hereinbefore. It should be noted that the dead stand 22 arrangement does not provide sufficient structural integrity to retain a substantial item of equipment during a seismic event.

Figure 7:
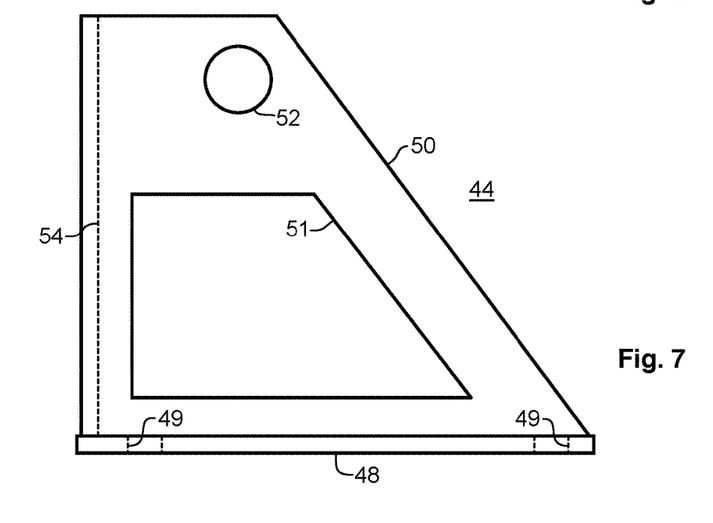
FIG. 7 is a side view drawing of a seismic bracket according to an illustrative embodiment of the present invention.
Figure 8:
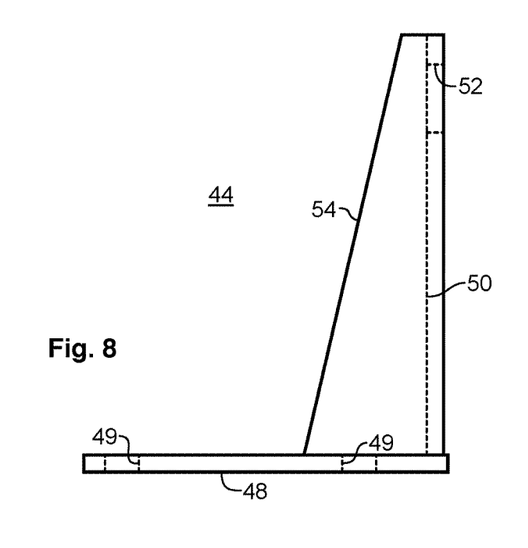
FIG. 8 is an end view drawing of a seismic bracket according to an illustrative embodiment of the present invention.

Reference is directed to FIG. 6, FIG. 7, and FIG. 8, which are a top view drawing, a side view drawing, and an end view drawing, respectively, of a seismic bracket 44 according to an illustrative embodiment of the present invention. The seismic bracket 44 comprises a mounting plate 48 with plural bolt holes 49 formed therethrough, and which align with bolt holes in a weigh module (not shown). A flange 50 extends upwardly from the mounting plate 48 and has a retention aperture 52 formed therethrough. A clearance opening 51 may also be provided for access to a weigh module (not shown). A flange brace 54, which is generally orthogonal to the flange 50 is provided, as illustrated, to reinforce the flange 50 and provide structural support about all three axes (vertical, lateral, longitudinal) of the retention opening 50. As will be discussed hereinafter, the flange 50 in the area of the retention opening 52 is where seismic forces are encountered during a failure. These forces are applied by the equipment (not shown), so the flange extends beyond the weigh module (not shown) such that the retention opening is located adjacent the equipment (not shown). In the illustrative embodiment, the seismic bracket is fabricated from stainless steel alloy plate that is welded or bent into shape, although, those skilled in the art will appreciate that other suitable structural materials may be employed depending on loads and environmental factors of each particular installation.

Figure 9:
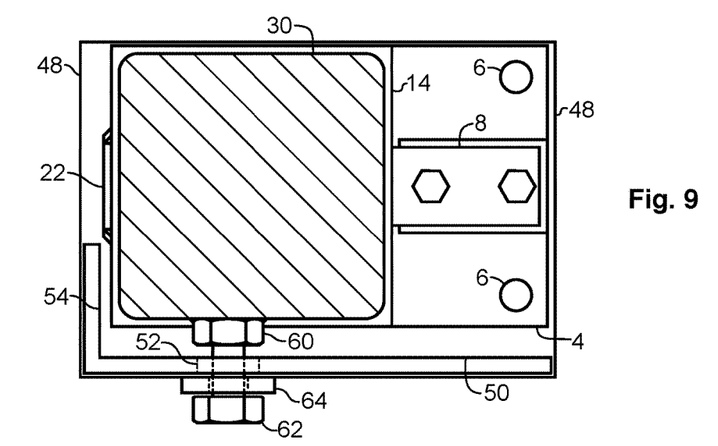
FIG. 9 is a top view drawing of an installed seismic retention assembly according to an illustrative embodiment of the present invention.
Figure 10:
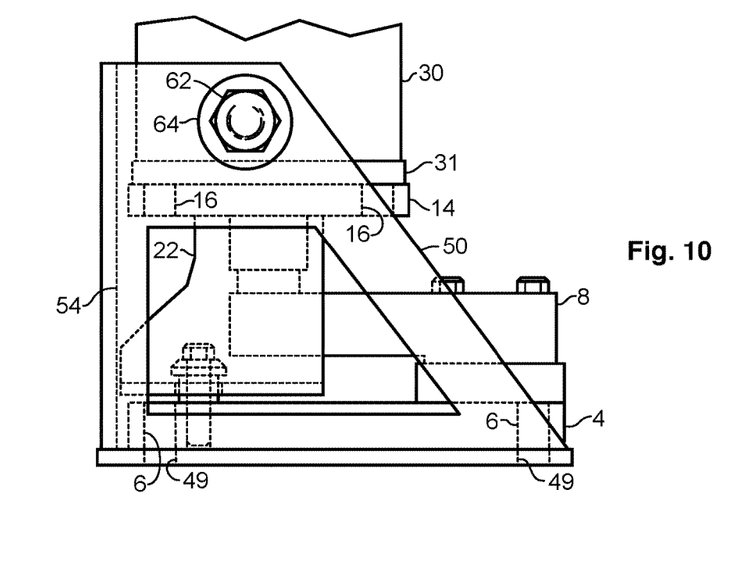
FIG. 10 is a side view drawing of an installed seismic retention assembly according to an illustrative embodiment of the present invention.
Figure 11:
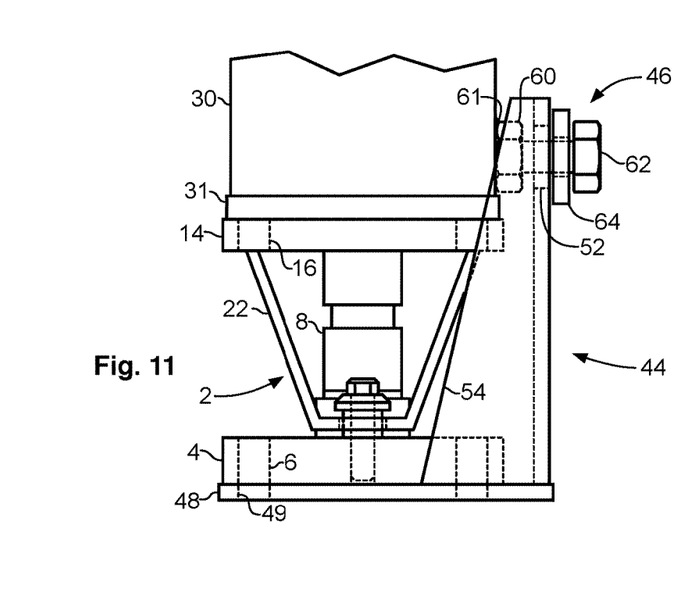
FIG. 11 is an end view drawing of an installed seismic retention assembly according to an illustrative embodiment of the present invention.

Reference is directed to FIG. 9, FIG. 10, and FIG. 11, which are a top view drawing, a side view drawing, and an end view drawing, respectively, of an installed seismic retention assembly according to an illustrative embodiment of the present invention. The seismic retention assembly comprises the seismic bracket 44 in combination with a retention fastener assembly 46. In this embodiment, a weigh module 2 rests upon the mounting plate 48 of the seismic bracket 44 and supports an item of equipment 30 by its mounting flange 31. The weigh module 2 base plate 4 rests on the seismic bracket 44 mounting plate, and correspondingly aligned bolts holes 6, 49 in these members, respectively, are for the insertion of assembly bolt sets (not shown). The weigh module 2 includes a top plate 14 with bolt holes 16 therethrough for assembly with an item of equipment 30. This weigh module 2 corresponds with FIGS. 3, 4, and 5, although, other weigh module configurations are equally applicable to the present teachings.

In FIGS. 9, 10, and 11, a flange 50 extends upwardly from the mounting plate 48 of the seismic bracket 44, and presents a retention aperture 52 adjacent to the equipment 30, as illustrated. A flange brace 54 also extends upwardly and joins the flange 50 in orthogonal arrangement to strengthen the assembly. Note that neither the flange 50, nor the flange brace 54, engage the weigh module 2 or the equipment 30. This is essential to unimpeded operation of the weight module during operation prior to a seismic event.

Seismic retention of the item of equipment 30 is accomplished with retention fastener assembly 46. A nut 60 is aligned with the retention opening 52, as illustrated, and welded 61 to the equipment 30. A bolt 62 is inserted through a retention washer 64 and through the retention aperture 52, and threadably engages the nut 60, and is torqued to hold the bolt 62 in place. Note that the diameter of the retention aperture is greater than the diameter of the shank of bolt 62, so the bolt does not engage the seismic bracket 44, but rather defines an annular clearance therebetween. In addition, the length of the bolt 62 and the spacing and thickness of the retention washer 64 are selected so that neither the bolt 62 head or retention washer 64 binds against the seismic bracket 44, but rather defines a clearance therebetween. It is these clearances that provide for unimpeded operation of the weigh module 2 prior failure during a seismic event. Once a seismic event does occur, and the weigh module 2 structurally fails, the movement of the equipment 30 with respect to the seismic bracket 44 is limited to the extent of these clearances. This is the essential benefit of the seismic retention assembly as a whole.

Figure 12A:
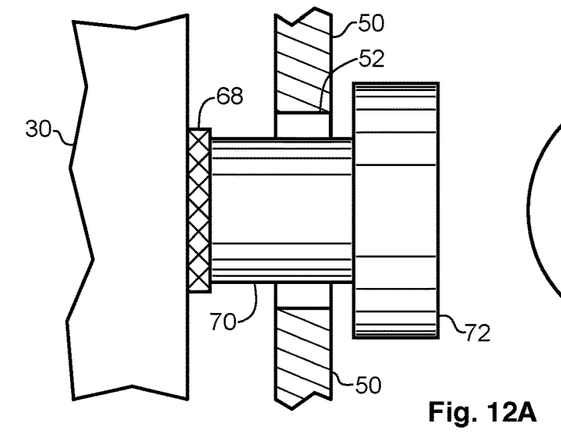
FIGS. 12A and 12B are detail view drawings of a retention stud installation according to an illustrative embodiment of the present invention.
Figure 12B:
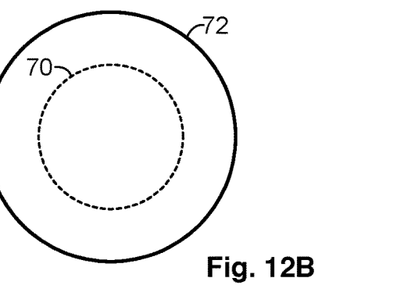

Reference is directed to FIGS. 12A and 12B, which is a detail view drawing of a retention stud 70 installation according to an illustrative embodiment of the present invention. In the prior embodiments, a nut and bolt were employed as the retention fastener assembly. In this illustrative embodiment, a stud 70 with an enlarged diameter boss 72 at its distal end are employed as the retention fastener assembly, and to define the clearances with respect to those elements and the retention aperture 52 in flange 50, as illustrated. The stud 70 is fixed to the item of equipment 30 at its proximal end using a means for rigid attachment 68. Various means are contemplated, including welding, brazing, press-fit, threaded engagement, an extension stud, cementing, fusing, and all other means for rigid attachment known to those skilled in the art.

Figures 13A, 13B:
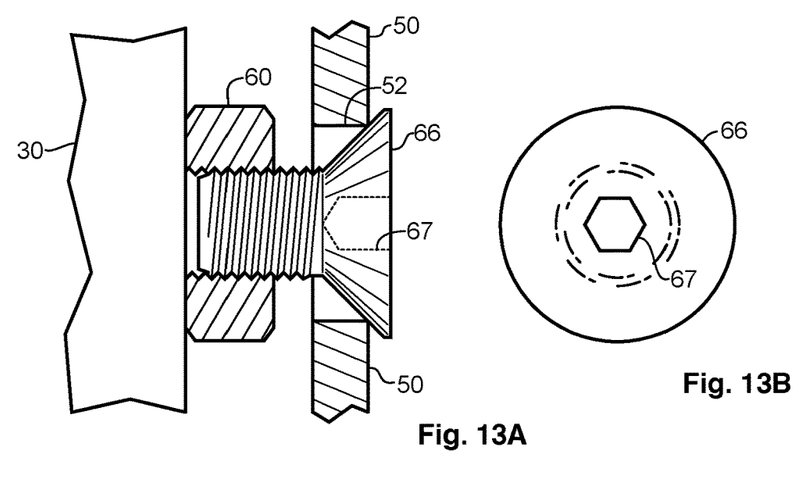
FIGS. 13A and 13B are detail view drawings of a centering bolt alignment procedure according to an illustrative embodiment of the present invention.

Reference is directed to FIGS. 13A and 13B, which are detail view drawings of a centering bolt 66 alignment procedure according to an illustrative embodiment of the present invention. Considering the need to define the clearance between the retention fastener and the retention aperture, it is to be understood that alignment of the nut 60 with respect to the retention aperture 52 is of critical importance. In an illustrative embodiment of the present disclosure, as centering bolt 66, which has a conical head portion with a hex-key drive 67, is provided as an alignment tool. The conical head bolt 66 is inserted through the retention aperture, and the nut 60 is threadably engaged therewith. The conical surface centers the bolt 66 in the aperture 52 and locates the nut 60 against the equipment 30, and then the nut 60 is welded to the equipment 30. The centering bolt 66 is then removed and is not used further in the installation process.

Figures 14A, 14B:
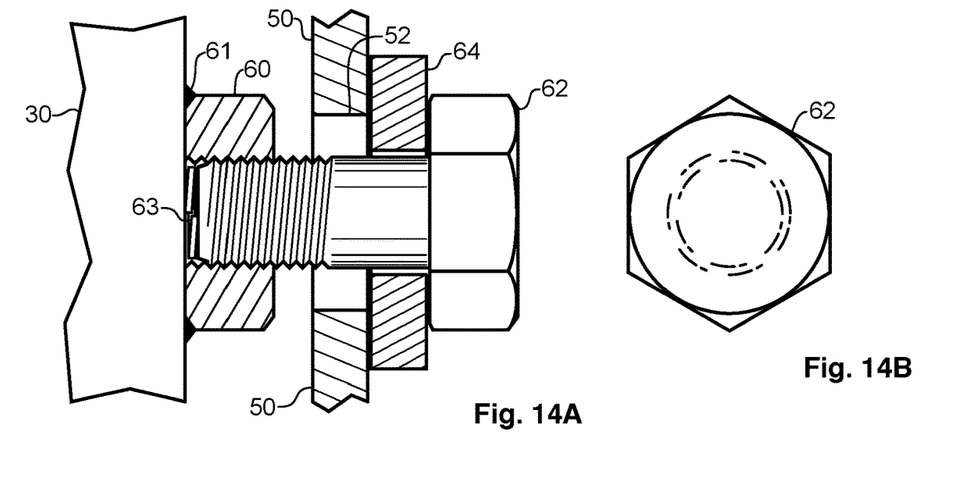
FIGS. 14A and 14B are detail view drawings of a retention assembly installation according to an illustrative embodiment of the present invention.

Reference is directed to FIGS. 14A and 14B, which are detail view drawings of a seismic retention assembly installation according to an illustrative embodiment of the present invention. Having located the nut 60 and having welded 61 the nut 60 in place, completion of the assembly process is as follows. The retention fastener consists of the nut 60, the retention washer 64, and the retention bolt 62. The washer 64 is installed on the bolt 64, and the bolt is inserted through the retention aperture 52 as illustrated. A split ring lock washer 63 is inserted into the nut 60, and the bolt 62 is threadably engaged with the nut 60. The bolt 62 is then torqued to compress the split ring lock washer 63, thereby locking the bolt 62 against rotation with respect to the nut 60. Note that the length of the bolt 62 shank portion and the thickness of the retention washer 64 are selected so that they do not bind with the flange 50 adjacent the retention aperture 52, but rather define a clearance therebetween, as discussed hereinbefore.

Figure 15:
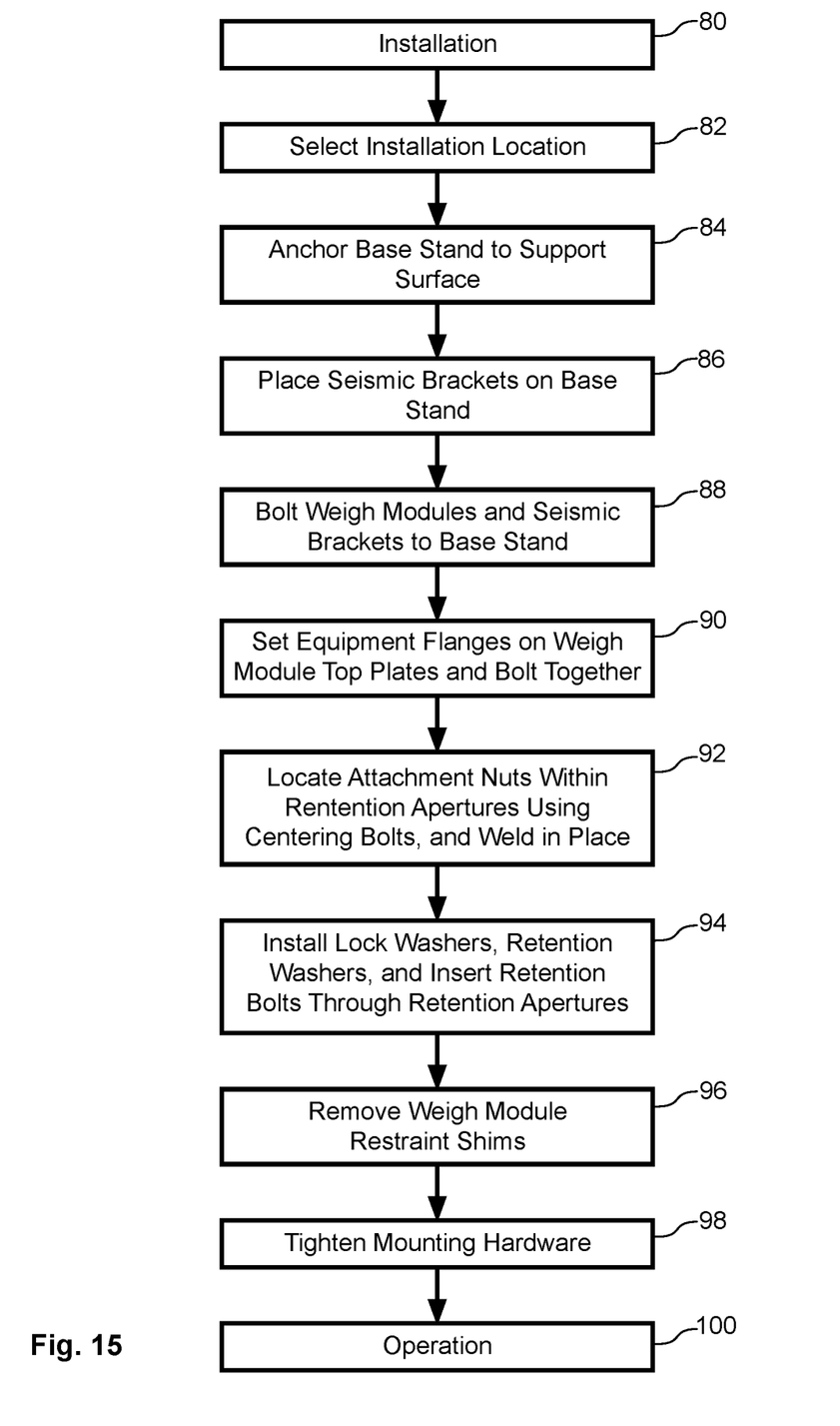
FIG. 15 is a process flow diagram of a seismic retention assembly installation according to an illustrative embodiment of the present invention.

Reference is directed to FIG. 15, which is a process flow diagram of a seismic retention assembly installation according to an illustrative embodiment of the present invention. The installation process begins at step 80 and proceeds to step 82 where a user selects an installation location for an item of equipment. At step 84, the base stand is anchored to the support structure surface. At step 86, the seismic bracket(s) are placed onto the support stand. At step 88, the weigh module(s) and seismic bracket(s) are bolted to the base stand. At step 90, the item of equipment is placed onto the weigh module(s) and they are bolted together in place. At step 92, the attachment nut(s) are centered within the retention aperture(s) using the centering bolt(s), and the nut(s) are then welded to the item of equipment. At step 94, the lock washer(s) are inserted into the nut(s), the retention washer(s) and retention bolt(s) are inserted through the retention aperture(s) and torqued into place. At step 96, any factory shipping restraints and shims are removed from the weigh module(s), thereby freeing the weigh module(s)s for normal operation. At step 98, all the mounting hardware is torqued to specification for normal operation. At step 100, normal operation commences.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A seismic retention assembly for equipment supported above a support structure by one or more weigh modules, each weigh module having a base plate, the assembly comprising:
   a seismic bracket having a mounting plate for placement between the support structure and the weigh module base plate, and having a flange fixed to said mounting plate that extends beyond the weigh module, and having a retention aperture formed therethrough and positioned adjacent to the equipment;
   a retention fastener, including a nut rigidly fixable to the equipment, which is aligned with said retention aperture, and including a bolt with a shank and a head, said shank passable through said retention aperture to threadably engage said nut while providing a clearance between said shank and said head of said bolt, and said flange and said retention aperture, to thereby enable unimpeded operation of the weigh module while preventing movement of the equipment beyond said clearance.

2. The assembly of claim 1, and wherein:
   said nut is rigidly fixable to said equipment by welded connection.

3. The assembly of claim 1, and further comprising:
   a flange brace extending from said mounting plate and joined with said flange in orthogonal alignment therewith, to thereby enable structural support along three axes with respect to said retention aperture.

4. The assembly of claim 1, and further comprising:
   a retention washer disposed about said shank of said bolt, and positioned between said flange and said head of said bolt to thereby retain said flange about said retention aperture thereabout.

5. The assembly of claim 1, and further comprising:
   a lock washer bindingly disposed within said nut and between a proximal end of said shank of said bolt and the equipment to thereby resist rotation of said bolt with respect to said nut.

6. The assembly of claim 1, and further comprising:
   a base stand disposed between said mounting plate and the support structure, and wherein
   said base stand includes plural seismic bracket mounting positions, and includes plural mounting clips fixed thereto, and adapted for fixed attachment to the support structure.

7. The assembly of claim 1, and further comprising:
   a centering bolt having a conical head portion and a threaded shank adapted to engage said nut, and wherein
   said centering bolt is suitable to locate and align said nut with respect to said retention aperture, and the equipment, by engagement of said conical portion with said retention aperture, to thereby locate said nut prior to rigid fitment of said nut to the equipment.

8. The assembly of claim 1, and wherein the weigh module base plate includes plural mounting holes, and wherein:
   said mounting plate includes plural bolt holes aligned with the plural mounting holes in the weigh module base plate.

9. A seismic retention assembly for equipment supported above a support structure by one or more weigh modules, each weigh module having a base plate, the assembly comprising:
   a seismic bracket having a mounting plate for placement between the support structure and the weigh module base plate, and having a flange fixed thereto, which extends beyond the weigh module, and having a retention aperture formed through said flange, and positioned adjacent to the equipment;
   a retention fastener, including an attachment means for rigid connection to the equipment at a location aligned with said retention aperture, and having a shank with a boss at a distal end thereof, said shank passable through said retention aperture to fixedly engage the equipment with said attachment means, while providing a clearance between said shank and said boss, and said flange and said retention aperture, to thereby enable unimpeded operation of the weigh module while preventing movement of the equipment beyond said clearance.

10. A method of installing a seismic retention assembly between a support structure and an item of equipment that is supported by one or more weigh modules, the seismic retention assembly including a seismic bracket with a mounting plate and a flange extending therefrom, the flange having a retention aperture formed therethrough, the seismic retention assembly further including a retention fastener comprised of a nut and a bolt having a shank and a head, the method including the steps of:

placing the mounting plate of the seismic bracket between the support structure and the weigh module base plate;

supporting the equipment on the weigh module, wherein the flange extends beyond the weigh module, thereby locating the retention aperture adjacent to the equipment;

positioning the nut adjacent the equipment and aligning the nut with the retention aperture;

rigidly fixing the nut to the equipment;

inserting the shank of the bolt through the retention aperture and threadably engaging a proximal end thereof with the nut, and thereby providing clearance between the shank and the head of the bolt, and the flange and the retention aperture, and thereby enabling unimpeded operation of the weigh module while preventing movement of the equipment beyond the clearance.

11. The method of claim 10, and wherein:

said rigidly fixing step further includes welding the nut to the equipment.

12. The method of claim 10, and wherein the flange is further reinforced by a flange brace extending from the mounting plate, and joined with said flange in orthogonal alignment therewith, thereby enabling structural support of the equipment along three axes with respect to the retention aperture.

13. The method of claim 10, and further comprising the step of:

disposing a retention washer about the shank of the bolt, and positioning the retention washer between the flange and the head of said bolt, thereby retaining the retention aperture thereabout.

14. The method of claim 10, and further comprising the step of:

disposing a lock washer within the nut and between a proximal end of the shank of the bolt and the equipment to thereby bindingly resisting rotation of the bolt with respect to the nut.

15. The method of claim 10, and further comprising the steps of:

locating and aligning the nut with resect to the retention aperture and the equipment by inserting a centering bolt, having a conical head portion and a threaded shank, through the retention aperture and engaging the nut with a proximal end thereof, and urging the nut against the equipment, and welding the nut to the equipment.

16. A method of installing a seismic retention assembly between a support structure and an item of equipment that is supported by one or more weigh modules, the seismic retention assembly including a seismic bracket with a mounting plate and a flange extending therefrom, the flange having a retention aperture formed therethrough, the seismic retention assembly further including a retention fastener comprising an attachment means for rigid connection to the equipment and a shank with a boss at a distal end thereof, the method including the steps of:

placing the mounting plate of the seismic bracket between the support structure and the weigh module base plate;

supporting the equipment on the weigh module, wherein the flange extends beyond the weigh module, thereby locating the retention aperture adjacent to the equipment;

positioning the attachment means adjacent the equipment and in alignment with the retention aperture;

inserting the shank through the retention aperture and fixedly engaging a proximal end thereof with the attachment means, and thereby providing clearance between the shank and the boss, and the flange and the retention aperture, and thereby enabling unimpeded operation of the weigh module while preventing movement of the equipment beyond the clearance.

* * * * *